United States Patent [19]
Tran

[11] Patent Number: 5,162,666
[45] Date of Patent: Nov. 10, 1992

[54] TRANSMISSION GATE SERIES MULTIPLEXER

[76] Inventor: Dzung J. Tran, 7353 SE. Hacienda, Hillsboro, Oreg. 97123

[21] Appl. No.: 670,075

[22] Filed: Mar. 15, 1991

[51] Int. Cl.[5] .............................................. G06F 3/00
[52] U.S. Cl. ..................................... 307/243; 307/443
[58] Field of Search ........................ 307/243, 443, 448

[56] References Cited

U.S. PATENT DOCUMENTS

| | | | |
|---|---|---|---|
| 4,363,107 | 12/1982 | Ohhashi et al. | 364/758 |
| 4,536,855 | 8/1985 | Morton | 364/786 |
| 4,566,064 | 1/1986 | Whitaker | 364/300 |
| 4,710,649 | 12/1987 | Lewis | 307/451 |
| 4,813,008 | 3/1989 | Shigehara et al. | 364/760 |
| 4,817,029 | 3/1989 | Finegold | 364/760 |
| 4,825,401 | 4/1989 | Ikumi | 364/760 |
| 4,879,677 | 11/1989 | Shiraishi | 364/760 |
| 5,012,126 | 4/1991 | Feldbaumer et al. | 307/243 |
| 5,015,883 | 5/1991 | Waller | 307/465 |
| 5,040,139 | 8/1991 | Tran | 364/760 |

OTHER PUBLICATIONS

Debord et al., "Analog Multiplexing Device", IBM Technical Disclosure Bulletin, vol. 20, No. 7, Dec. 1977.

Toshiba TC19G000 Series Macrocell Data Sheet (May, 1986) pp. 1-109 and 1-110.

H. Hnatek, User's Guidebook To Digital CMOS Circuits (McGraw-Hill 1981) pp. 34-41.

R. R. Shively, et al., "Cascading Transmissions Gates to Enhance Multiplier Performance" IEEE Transactions on Computers, vol. C-33, No. 7, Jul. 1984.

K. Yano, et al., "A 3.8 ns 16×16 Multiplier Using Complementary Pass Transistor Logic" IEEE 1989 Custom Integrated Circuits Conference.

Primary Examiner—Robert J. Pascal
Attorney, Agent, or Firm—Marger, Johnson, McCollom & Stolowitz, Inc.

[57] ABSTRACT

A multiplexer circuit is formed of two-to-one transmission gate multiplexer (TGM) circuits (80) connected in series. A first stage TGM (80) selects among two of the input variable signals (I0,I1). Each subsequent stage TGM (70) selects among the next preceding stage output signal (81) and another one of the input variable signals (I2). Each TGM is controlled by a unique control signal (S1,S2) so that loading on the control lines is limited to one TGM circuit to improve propagation delay. The series arrangement of TGM circuits can be extended as needed (M3,M4,M5).

27 Claims, 3 Drawing Sheets

TRANSMISSION GATE SERIES MULTIPLEXER

BACKGROUND OF THE INVENTION

The present invention relates to the field of digital logic circuits and, in particular, relates to improved multiplexer circuits.

Known multiplexer circuits are built up of a binary tree arrangement of "one-of-two" or 2-input multiplexer circuits. For N input variables, a first stage (or input stage) comprises N/2 2-input multiplexers, arranged in parallel to receive the input variables. Each stage reduces the number of signals in half, so each stage requires half as many 2-input multiplexers as the preceding stage. The final stage (or output stage) selects one of two remaining signals as the output signal.

To illustrate, a known 8-input or 8:1 multiplexer circuit comprises an input stage having four 2-input multiplexer circuits arranged in parallel to receive the input variables and provide four output signals. A second stage comprises two 2-input multiplexer circuits arranged in parallel to reduce the four first-stage output signals to two output signals. A final stage 2-input multiplexer selects one of the two output signals as the multiplexer output signal.

In the prior art, all of the multiplexers in each stage are controlled by a corresponding binary control signal. Thus, prior art multiplexers have $\log_2$ stages, and have $\log_2$ control (or select) inputs, for selecting one of the input variable signals. Examples of known multiplexer circuits are shown in the TC19G000 Macrocell Data Sheet at pages 1-109 (mux 4 cell) and 1-110 (mux 8 cell) (1986).

One disadvantage of known multiplexers is loading on the control inputs. The control inputs must drive all of the multiplexer circuits in a stage, which may be, for example, 8 or 16 muxes in the first stage. This can lead to undue delay in controlling the circuit.

Another limitation inherent in the prior art approach is the use of $\log_2$ control (or select) lines. This requires binary encoding the desired selection. A greater number of select lines could be used to simplify such encoding.

It is also known in the prior art to arrange a pair of transmission gates so as to form a 2:1 multiplexer circuit. Each of the transmission gates comprises a pass transistor or a complementary pair of transistors, such as a CMOS pair. Usage of various forms of transmission gates in logic circuitry is disclosed in applicant's U.S. Pat. No. 5,040,139 and referenced cited therein.

SUMMARY OF THE INVENTION

An object of the present invention is to select one of a plurality of input variable signals as an output signal, i.e. to provide a multiplexer function, while minimizing loading on select signal lines.

Another object of the invention is to increase the number of select lines in a multiplexer circuit to ease select encoding requirements.

Yet another object of the invention is to improve compaction in multiplexer circuit layout.

According to the present invention, multiplexer circuits are formed by a series connection of stages, each stage comprising a single 2-input multiplexer circuit. Each stage preferably comprises a pair of transmission gates arrange as a 2:1 multiplexer circuit. In general, to form an N:1 multiplexer circuit requires N−1 such series-connected stages.

These new "serial multiplexer" circuits limit loading on each control signal input to but a single load. The new multiplexers also provide for a greater number of control inputs, namely N−1 control inputs as compared to $\log_2$ control inputs in the prior art.

The invention is a novel multiplexer circuit for selecting one of a plurality of input variable signals. The circuit comprises two or more TGM circuits coupled in series. Each TGM circuit has first and second transmission gates and has first and second input terminals, as well as an output terminal and a control terminal. The output terminal of the first one of the TGM circuits is coupled to one of the input terminals of the second, adjacent one of the TGM circuits. In this way, an output signal from the first TGM circuit is propagated to one of the inputs of the second TGM circuit as an input signal. The other one of the second TGM input terminals is coupled to receive one of the input signals, whereby each TGM circuit selects either the output of an adjacent, preceding TGM circuit or one of the input signals.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Figure 1:
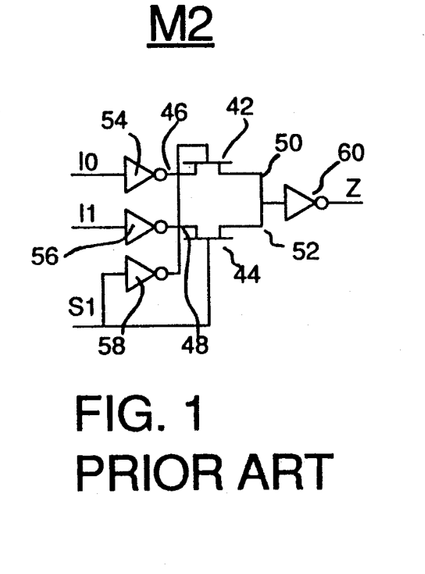
FIG. 1 is a schematic diagram of a known 2-input multiplexer circuit.

FIG. 1 is a schematic diagram of a known 2:1 multiplexer circuit. The circuit is designated "M2" as an abbreviation for a 2-input multiplexer. The M2 circuit includes a pair of transmission gates 42,44. The transmission gates are drawn as simple pass transistors for clarity, here as well as in FIGS. 3-5. Preferably each transmission gate comprises a complementary pair of transistors, as is known.

Transmission gates 42,44 have input terminals coupled through inverters or buffers 54,56 to receive input variables I0,I1 respectively. The transmission gates are controlled by a control input S1. The outputs 50,52 from the transmission gates are connected together to form a single output terminal. The output signal is coupled through an inverter 60 to provide output signal Z. Inverter 60 provides positive logic and buffers the output signal. In operation, the state of control input S1 selects one of input variables I0,I1 for output at Z.

The pair of transmission gates 42,44 together with their associated control input S1 and inverter 58, define a "TGM" (transmission gate multiplexer) circuit. In a TGM circuit, the two transmission gate outputs are connected together to form the TGM output terminal.

Figure 2:
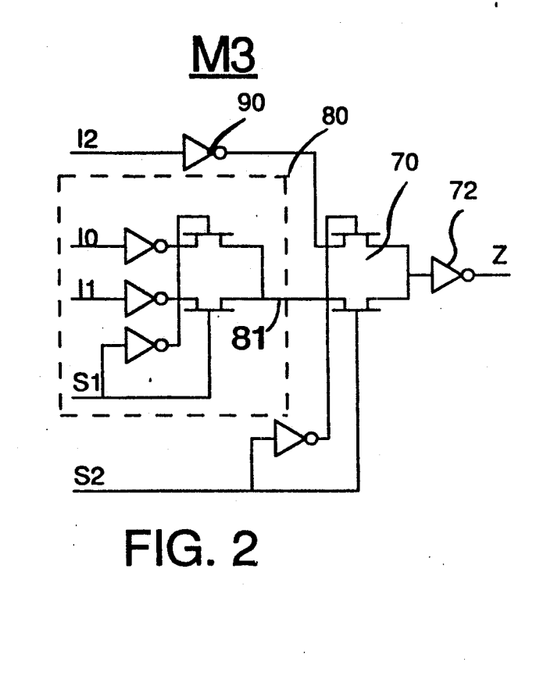
FIG. 2 is a schematic diagram of a 3:1 multiplexer circuit according to the present invention.

FIG. 2 is a schematic diagram of a 3:1 series multiplexer circuit M3 according to the present invention.

Again, transmission gates are shown as pass transistors for clarity. A first (input) stage of circuit M3 comprises a first TGM circuit indicated by dashed box 80. TGM 80 includes a pair of transmission gates coupled through inverters or buffers to receive input variables I0,I1. TGM 80 is controlled by a first binary control signal S1.

The output terminal 81 of TGM 80 is connected to one signal input to a second (output) stage TGM 70. TGM 70 includes a second signal input coupled through an inverter 90 to receive a third input variable I2. TGM circuits 80,70 thus are connected in series. TGM 70 is controlled by a second control signal S2. In operation, the states of control signals S1,S2 route one of the input variable signals I0,I1,I2 through an inverter/buffer 72 to the output Z as a final output signal.

Figure 3:
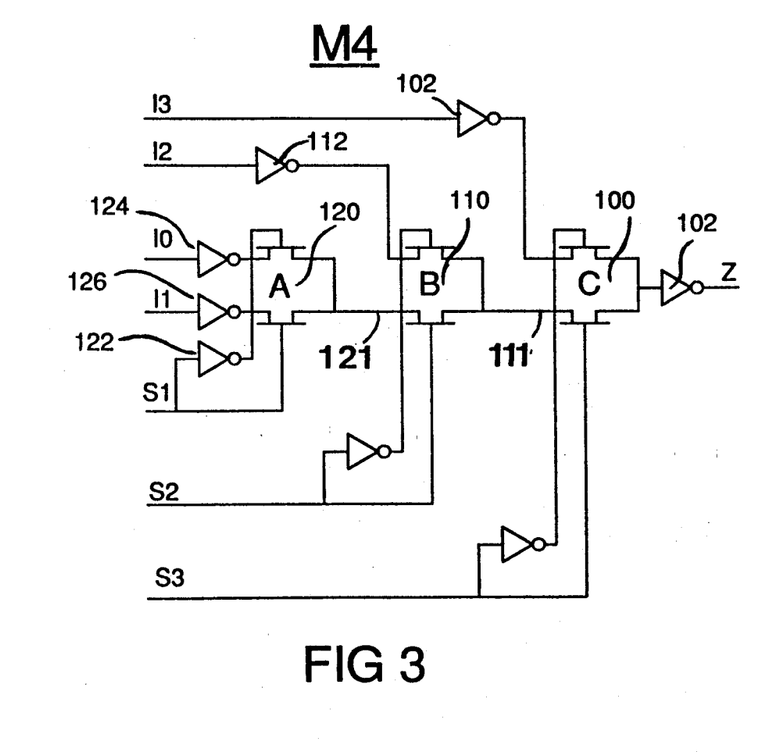
FIG. 3 is a schematic diagram of a 4:1 multiplexer circuit according to the present invention.

FIG. 3 is a schematic diagram of a 4:1 multiplexer circuit M4. Circuit M4 includes an input stage TGM circuit 120. The signal inputs to TGM 120 are coupled through inverters 124,126 to receive input variables I0 and I1 respectively. TGM 120 is controlled by a first control signal S1, similar to TGM 80 in FIG. 2.

The output terminal 121 of TGM 120 is coupled to one signal input to a second stage TGM 110, also similar to FIG. 2. TGM 110 has a second signal input coupled through an inverter 112 to receive a third input variable signal I2. TGM 110 is controlled by a second control input S2.

The output terminal 111 of TGM 110 is connected to one signal input to a third (output) stage TGM 100. TGM 100 includes a second signal input coupled through an inverter 102 to receive a fourth input variable signal I3. TGM 100 is controlled by a third control input signal S3. In operation, the states of control input signals S1,S2,S3 route a selected one of the input variable signals I0-I3 through inverter/buffer 102 to the output Z.

Figure 4:
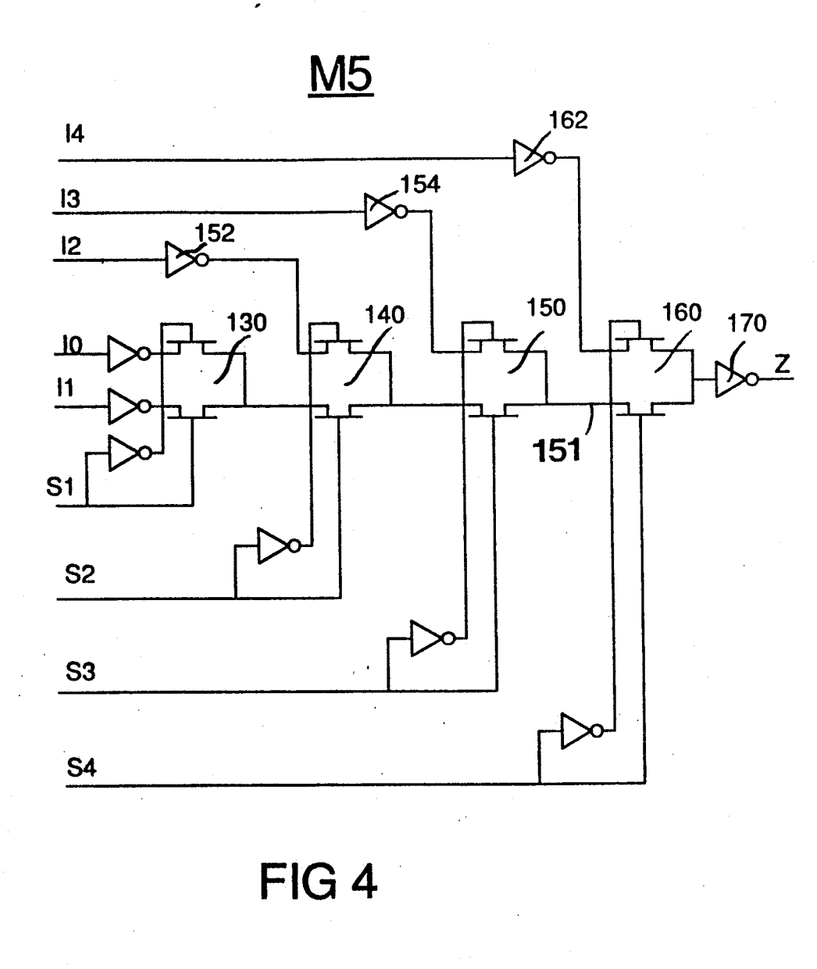
FIG. 4 is a schematic diagram of a 5:1 multiplexer circuit according to the present invention.

FIG. 4 is a schematic diagram of a 5:1 multiplexer circuit M5. Circuit M5 includes a first three stages of TGM circuits 130,140,150 which are arranged serially in the same manner as circuit M4 of FIG. 3. Thus, the first stage TGM 130 receives input variable signals I0,I1 and is controlled by a first control signal S1. Each of stages 140, 150 has one input connected to the output terminal of the preceding stage TGM, and a second input coupled through an inverter 152, 154 to receive a corresponding one of the input variable signals I2,I3 respectively. TGM circuits 140,150 are controlled by second and third control input signals S2,S3 respectively.

A fourth (output) TGM stage 160 has one input connected to the output terminal 151 of TGM 150. TGM 160 includes a second signal input coupled through an inverter 162 to receive input variable signal I4. TGM 160 is controlled by a fourth control signal S4. In operation, the states of control signals S1-S4 control the TGM stages to route one of the input variable signals I0-I4 through an inverter/buffer 170 to the output terminal Z.

The serial arrangement of TGM stages shown in FIGS. 2-4 for forming multiplexer circuits can be extended to an arbitrary number of stages, subject to buffering considerations to restore signal gain as necessary. Thus, an N:1 multiplexer circuit can be constructed using N−1 stages of TGM circuits, each stage being controlled by a corresponding one of N−1 control input signals. Each TGM receives the output of the next preceding stage at one signal input, and one of the input variables at the other signal input.

In general, a series multiplexer circuit according to the invention comprises a series of N−1 stages, where N is the number of input variables (designated I0 ... I(N−1)), for selecting one of the input variables as an output signal at an output terminal Z. Each stage comprises a TGM circuit controlled by a corresponding control input signal (S1 ... S(N−1)).

The output terminal of each TGM is coupled to one of the signal inputs to a next adjacent stage TGM, except for the final stage in which the TGM output terminal provides the multiplexer circuit final output terminal. The other signal input to each TGM stage is coupled to receive one of the input variables.

The multiplexer circuit output optionally may be routed through an inverter or other buffer to provide positive logic and/or to restore signal gain. The necessity of such a buffer depends upon the particular IC process used. Typically, a buffer is required after four TGM stages (see FIG. 5, described below). Such a buffer may be inserted at any point along the TGM serial chain, assuming due regard to logic state if the buffer is an inverter. This allows some flexibility in layout.

Operation of these multiplexer circuits in general is as follows. The first or "input stage" TGM circuit is controlled by the corresponding control signal (S1) to select one of first and second input variable signals (I0,I1) as the first TGM output signal. Each subsequent TGM circuit is controlled by the corresponding control signal to select either the next preceding TGM output signal, or a respective one of the input variable signals (e.g.I2), as the TGM output signal. The final stage TGM circuit selects either the next preceding TGM output signal, or a final one of the input variable signals ($I_N$) as the final output signal.

Because a unique control signal is provided to each of the TGM circuits, loading on each of the control signals is limited to one TGM circuit. While propagation delay will of course increase with additional stages, the delay is actually less than prior art devices. This is because the number of stages required is no more than in the prior art, yet loading is minimized so that propagation delay is minimized.

Figure 5:
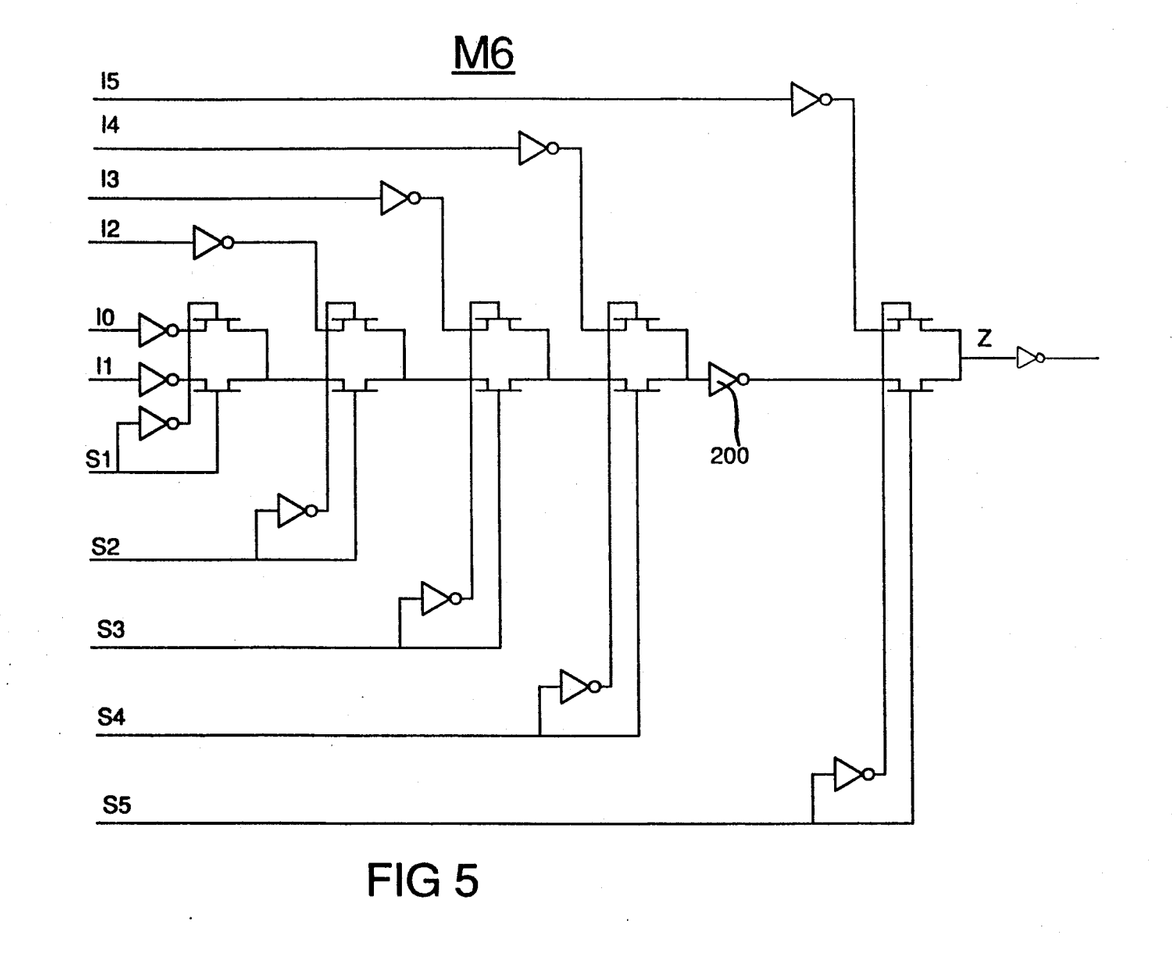
FIG. 5 is a schematic diagram of a 6:1 multiplexer circuit according to the present invention.

FIG. 5 is a schematic diagram of a 6:1 multiplexer circuit M6 according to the invention. The M6 circuit is similar to the M5 circuit of FIG. 4, except that the M6 circuit includes an additional TGM stage, so that the circuit accomodates six input variable signals I0-I5 and five control signals S1-S5. The same principles of operation apply as described above. Here it may also be observed that an inverter/buffer 200 is shown, by way of example, on the input side of the final stage to restore gain.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A multiplexer circuit for selecting one of a plurality of input variable signals, comprising:
   two or more TGM circuits coupled in series;
   each TGM circuit including first and second transmission gates and having first and second input terminals, an output terminal and a control terminal;

the output terminal of a first one of the TGM circuits coupled to one of the input terminals of a second, adjacent one of the TGM circuits so as to propagate a selected one of the input signals through the first TGM circuit to said one input terminal of the second TGM circuit as an input signal; and the other one of the second TGM input terminals coupled to receive one of the input signals, so that each successive TGM circuit in the series selects between the output of a next preceding TGM circuit and one of the input signals.

2. The multiplexer circuit according to claim 1 wherein each TGM circuit comprises a pair of transmission gates.

3. A multiplexer circuit according to claim 2 wherein each transmission gate comprises a pass transistor.

4. A multiplexer circuit according to claim 2 wherein each transmission gate comprises a complementary pair of transistors.

5. A multiplexer circuit according to claim 1 including a buffer circuit coupled to at least one of the TGM input terminals.

6. A multiplexer circuit according to claim 1 wherein at least one of the TGM circuits includes a pair of transmission gates and the control terminal of said one TGM circuit is coupled directly to a first one of the pair of transmission gates and is coupled through an inverter to the other transmission gate for controlling the pair of transmission gates in a complementary manner.

7. A multiplexer circuit for selecting one of a plurality of input variable signals comprising:

two or more TGM circuits coupled in series;

each TGM circuit including first and second transmission gates and having first and second input terminals, an output terminal and a control terminal;

the output terminal of a first one of the TGM circuits coupled to one of the input terminals of a second, adjacent one of the TGM circuits;

the other one of the second TGM input terminals coupled to receive one of the input variable signals, whereby each TGM circuit selects one of the output of a next preceding TGM circuit and one of the input variable signals; and wherein each TGM control terminal is coupled to receive a unique control signal.

8. A multiplexer circuit according to claim 7 wherein each TGM circuit comprises a pair of transmission gates.

9. A multiplexer circuit according to claim 8 wherein each transmission gate comprises a pair of pass transistors.

10. A multiplexer circuit according to claim 8 wherein each transmission gate comprises a complementary pair of transistors.

11. A multiplexer circuit according to claim 7 including a buffer circuit coupled to at least one of the TGM input terminals.

12. A multiplexer circuit for selecting one of N input variable signals as a final output signal, where N is an integer greater than or equal to three, responsive to the states of N−1 binary control signals, comprising:

N−1 transmission gate multiplexer (TGM) circuits, each TGM circuit including a pair of signal input terminals, a control terminal and an output terminal;

each control terminal coupled to receive a respective one of the binary control signals;

each first input terminal except the first stage first input terminal coupled to the output terminal of a next adjacent stage;

each second input terminal coupled to receive a respective one of the input variables; and the input stage first input terminal coupled to receive a first one of the input variables, whereby the final stage output terminal provides a selected one of the input variable signals as the final output signal.

13. A multiplexer circuit according to claim 12 including a buffer circuit coupled to at least one of the TGM input terminals.

14. A multiplexer circuit according to claim 12 wherein at least one of the TGM circuits includes a pair of transmission gates and the control terminal of said one TGM circuit is coupled directly to a first one of the pair of transmission gates and is coupled through an inverter to the other transmission gate for controlling the pair of transmission gates in a complementary manner.

15. A multiplexer circuit comprising:

a first stage TGM circuit having first and second signal input terminals, a control input terminal and an output terminal;

the first and second signal input terminals coupled to receive first and second input variables, respectively;

the control input coupled to receive a first control signal;

a second stage TGM circuit having first and second signal input terminals, a control input terminal and an output terminal;

one of the second stage signal input terminals coupled to the first stage output terminal;

the other one of the second stage signal input terminals coupled to receive a third input variable; and the second stage control input terminal coupled to receive a second control signal;

whereby the circuit forms a three-to-one multiplexer.

16. A multiplexer circuit according to claim 15 further comprising:

a third stage TGM circuit having first and second signal input terminals, a control input terminal and an output terminal;

one of the third stage signal input terminals coupled to the second stage output terminal;

the other one of the third stage signal input terminals coupled to receive a fourth input variable; and the third stage control input terminal coupled to receive a third control signal;

whereby the circuit forms a 4:1 multiplexer.

17. A multiplexer circuit according to claim 16 further comprising:

a fourth stage TGM circuit having first and second signal input terminals, a control input terminal and an output terminal;

one of the fourth stage signal input terminals coupled to the third stage output terminal;

the other one of the fourth stage signal input terminals coupled to receive a fifth input variable; and the fourth stage control input terminal coupled to receive a fourth control signal;

whereby the circuit forms a 5:1 multiplexer.

18. A multiplexer circuit according to claim 15 including a buffer circuit coupled to at least one of the TGM input terminals.

19. A method of selecting one of a plurality N of input variable signals as a final output signal, comprising the steps of:

provide N−1 two-to-one transmission gate multiplexer (TGM) circuits coupled in series;

in a first one of the TGM circuits, selecting one of first and second input variable signals as the first TGM output signal;

in each subsequent TGM circuit, selecting one of the next preceding TGM output signal and a respective one of the input variable signals as the TGM output signal; and in a final one of the TGM circuits, selecting one of the next preceding TGM output signal and a final one of the input variable signals as the final output signal.

20. A method according to claim 19 further comprising providing N−1 control signals and controlling each of the TGM circuits with a respective one of the control signals, thereby limiting the loading on each of the control signals to one TGM circuit.

21. A multiplexer circuit for selecting one of a plurality of input signals, comprising:

two or more 2:1 multiplexer circuits coupled in series, each multiplexer circuit having first and second input terminals, an output terminal and a control terminal;

the output terminal of a first one of the multiplexer circuits coupled to one of the input terminals of a second, adjacent one of the multiplexer circuits so as to propagate a selected one of the input signals through the first multiplexer circuit to said one input terminal of the second multiplexer circuit as an input signal; and the other one of the second multiplexer input terminals coupled to receive one of the input signals, so that each successive multiplexer circuit in the series selects between the output of a next preceding multiplexer circuit and one of the input signals.

22. A multiplexer circuit for selecting one of a plurality of input signals comprising:

two or more multiplexer circuits coupled in series;

each multiplexer circuit having first and second input terminals, an output terminal and a control terminal;

the output terminal of a first one of the multiplexer circuits coupled to one of the input terminals of a second, adjacent one of the multiplexer circuits;

the other one of the second multiplexer input terminals coupled to receive one of the input variable signals, whereby each multiplexer circuit selects one of the output of a next preceding multiplexer circuit and one of the input variable signals; and each multiplexer control terminal being coupled to receive a unique control signal.

23. A multiplexer circuit for selecting one of N input variable signals as a final output signal, where N is an integer greater than or equal to three, responsive to the states of N−1 binary control signals, comprising:

N−1 two-to-one 2:1 multiplexer circuits, each multiplexer circuit including a pair of input terminals, a control terminal and an output terminal;

each control terminal coupled to receive a respective one of the binary control signals;

each first input terminal except a first multiplexer first input terminal coupled to the output terminal of a next adjacent multiplexer;

each second input terminal coupled to receive a respective one of the input variables; and the first multiplexer first input terminal coupled to receive a first one of the input variables, whereby the final multiplexer output terminal provides a selected one of the input variable signals as the final output signal.

24. A multiplexer circuit comprising:

a first stage multiplexer circuit having first and second signal input terminals, a control input terminal and an output terminal;

the first and second signal input terminals coupled to receive first and second input variables, respectively;

the control input coupled to receive a first control signal;

a second stage multiplexer circuit having first and second signal input terminals, a control input terminal and an output terminal;

one of the second stage signal input terminals coupled to the first stage output terminal;

the other one of the second stage signal input terminals coupled to receive a third input variable; and the second stage control input terminal coupled to receive a second control signal;

whereby the circuit forms a three-to-one multiplexer.

25. A multiplexer circuit according to claim 24 further comprising:

a third stage multiplexer circuit having first and second signal input terminals, a control input terminal and an output terminal;

one of the third stage signal input terminals coupled to the second stage output terminal;

the other one of the third stage signal input terminals coupled to receive a fourth input variable; and the third stage control input terminal coupled to receive a third control signal;

whereby the circuit forms a 4:1 multiplexer.

26. A multiplexer circuit according to claim 25 further comprising:

a fourth stage multiplexer circuit having first and second signal input terminals, a control input terminal and an output terminal;

one of the fourth stage signal input terminals coupled to the third stage output terminal;

the other one of the fourth stage signal input terminals coupled to receive a fifth input variable; and the fourth stage control input terminal coupled to receive a fourth control signal;

whereby the circuit forms a 5:1 multiplexer.

27. A method for selecting one of a plurality N of input variable signals as a final output signal, comprising the steps of:

providing N−1 two-to-one multiplexer circuits coupled in series;

in a first one of the multiplexer circuits, selecting one of first and second input variable signals as the first multiplexer output signal;

in each subsequent multiplexer circuit, selecting one of the next preceding multiplexer output signal and a respective one of the input variable signals as the multiplexer output signal; and in a final one of the multiplexer circuits, selecting one of the next preceding multiplexer output signal and a final one of the input variable signals as the final output signal.

* * * * *

(12) EX PARTE REEXAMINATION CERTIFICATE (6763rd)
United States Patent
Tran (10) Number: US 5,162,666 C1
(45) Certificate Issued: Apr. 14, 2009

(54) TRANSMISSION GATE SERIES MULTIPLEXER

(75) Inventor: Dzung J. Tran, Hillsboro, OR (US)

(73) Assignee: Translogic Technology, Inc., Hillsboro, OR (US)

Reexamination Request:
No. 90/005,384, Jun. 4, 1999
No. 90/005,823, Sep. 26, 2000
No. 90/005,881, Dec. 8, 2000
No. 90/006,051, Jul. 3, 2001
No. 90/006,392, Sep. 27, 2002

Reexamination Certificate for:
Patent No.: 5,162,666
Issued: Nov. 10, 1992
Appl. No.: 07/670,075
Filed: Mar. 15, 1991

(51) Int. Cl.
*H04J 3/04* (2006.01)

(52) U.S. Cl. .................................... 327/408; 326/21
(58) Field of Classification Search .............. None
See application file for complete search history.

(56) References Cited

U.S. PATENT DOCUMENTS

| | | | |
|---|---|---|---|
| 3,100,294 A | 8/1963 | Dryden | |
| 3,769,523 A | 10/1973 | Suzuki | |
| 4,479,067 A | * 10/1984 | Fujita | 326/86 |
| 4,593,390 A | 6/1986 | Hildebrand et al. | |
| 4,926,423 A | 5/1990 | Zukowski | |
| 5,040,139 A | 8/1991 | Tran | |
| 5,047,976 A | 9/1991 | Goto | |
| 5,198,705 A | 3/1993 | Galbraith et al. | |
| 5,434,810 A | 7/1995 | Goto et al. | |

FOREIGN PATENT DOCUMENTS

| | | |
|---|---|---|
| EP | 0 098 692 A2 | 8/1983 |
| JP | 63107222 | 12/1988 |
| JP | 1-181127 A | 7/1989 |
| JP | 1181127 A | 7/1989 |
| JP | 244531 | 9/1989 |
| JP | 244531 | 10/1989 |
| JP | 256219 | 10/1989 |
| JP | 281529 | 11/1989 |
| JP | 2-220130 A | 9/1990 |
| JP | 2220130 A | 9/1990 |
| JP | 4934248 | 9/1997 |

OTHER PUBLICATIONS

Verdict Form, *Translogic Technology, Inc. v. Hitachi, Ltd., et al.*, Case No. 99–407–PA, U.S. Patent No. 6,162,666, Oct. 27, 2003.
Jury Instructions, *Translogic Technology, Inc. v. Hitachi, Ltd., et al.*, Case No. 99–407–PA, U.S. Patent No. 6,162,666, Oct. 27, 2003.
F. Ware et al. "64 Bit Monolithic Floating Point Processors", IEEE Journal of Solid–State Circuits SC–17:895–906 (Oct. 1982).

(Continued)

*Primary Examiner*—Albert J Gagliardi (57) ABSTRACT

A multiplexer circuit is formed of two-to-one transmission gate multiplexer (TGM) circuits (80) connected in series. A first stage TGM (80) selects among two of the input variable signals (10,11). Each subsequent stage TGM (70) selects among the next preceding stage output signal (81) and another one of the input variable signals (12). Each TGM is controlled by a unique control signal (S1,S2) so that loading on the control lines is limited to one TGM circuit to improve propagation delay. The series arrangement of TGM circuits can be extended as needed (M3,M4,M5).

At the time of issuance and publication of this certificate, the patent remains subject to pending reissue application number 12/322,857 filed Feb. 9, 2009. The claim content of the patent may be subsequently revised in the reissue proceeding.

OTHER PUBLICATIONS

Order, *Translogic Technology, Inc.* v. *Hitachi, Ltd., et al.*, Case No. 99-407-PA, U.S. Patent No. 6,162,666, Oct. 6, 2003.

Supplemental Expert Report of Doran K. Wilde, *Translogic Technology, Inc.* v. *Hitachi, Ltd., et al.*, Case No. 99-407-PA, U.S. Patent No. 6,162,666, Filed Oct. 8, 2003.

Second Report and Recommendation of Special Master Regarding Claim Construction, *Translogic Technology, Inc.* v *Hitachi, Ltd., et al.*, Case No. 99-407-PA, U.S. Patent No. 6,162,666, Filed Oct. 3, 2003.

Expert Report of Joseph Tran, *Translogic Technology, Inc.* v. *Hitachi, Ltd., et al.*, Case No. 99-407-PA, U.S. Patent No. 6,162,666, Filed Aug. 13, 2003.

Supplemental Expert Disclosure Statement of Carl M. Sechen, Ph.D., *Translogic Technology, Inc.* v. *Hitachi, Ltd., et al.*, Case No. 99-407-PA, U.S. Patent No. 6,162,666, Dated Sep. 19, 2003.

Expert Disclosure Statement of Carl M. Sechen, Ph.D., *Translogic Technology, Inc.* v. *Hitachi, Ltd., et al.*, Case No. 99-407-PA, U.S. Patent No. 6,162,666, Dated Jul. 25, 2003.

Declaration of Harry L. (Nick) Tredennick, Ph.D. in Support of Defendant's Motion for Summary Judgment of Noninfringement, *Translogic Technology, Inc.* v. *Hitachi, Ltd., et al.*, Case No. 99-407-PA, U.S. Patent No. 6,162,666, Dated Mar. 21, 2002.

V.G. Oklobdzija, "Simple and Efficient MOS Circuit for Fast VLSI Adder Realization," *Proceedings of the International Symosium on Circuits and Systems* (ISCAS), pp. 235–238, (1988).

H. Taub, *Digital Circuits and Microprocessors*, McGraw Hill (1982).

T. Kilburn et al., "A Parallel Arithmetic Unit Using a Saturated–Transistor Fast–Carry Circuit," *Proc. IEE*, Part B, 107:573–584, (1960).

M. Wu et al., "A unified theory for MOS circuit design–switching network logic," *Int. J. Electronics* 58:1–33 (1985).

S. R. Whitaker, "Design of Combination Logic with Pass Transistors," M.S. Thesis, University of Idaho (1982).

D. Radhakrishnan, "Theory and Design of Pass Transistor Switching Circuits," Ph.D. Dissertation, University of Idaho, May 1983.

N. Weste and K. Eshragian, "Principles of CMOS VLSI Design," Addison–Wesley (1985).

M. Annaratone, "Digital CMOS Circuit Design," Kluwer Academic Publishers, Boston (1986).

J. Uyemura, "Fundamentals of MOS Digital Integrated Circuits," Addison–Wesley (1998).

Transcript of Proceedings (Jury Trial), *Translogic Technology, Inc.* v. *Hitachi, Ltd., et al.*, Case No. 99-407-PA, U.S. Patent No. 6,162,666, Oct. 21, 2003, vol. 1.

Transcript of Proceedings (Jury Trial), *Translogic Technology, Inc.* v. *Hitachi, Ltd., et al.*, Case No. 99-407-PA, U.S. Patent No. 6,162,666, Oct. 22, 2003, vol. 2.

Transcript of Proceedings (Jury Trial), *Translogic Technology, Inc.* v. *Hitachi, Ltd., et al.*, Case No. 99-407-PA, U.S. Patent No. 6,162,666, Oct. 23, 2003, vol. 3.

Transcript of Proceedings (Jury Trial), *Translogic Technology, Inc.* v. *Hitachi, Ltd., et al.*, Case No. 99-407-PA, U.S. Patent No. 6,162,666, Oct. 27, 2003, vol. 4.

Transcript of Proceedings, *Translogic Technology, Inc.* v. *Hitachi, Ltd., et al.*, Case No. 99-407-PA, U.S. Patent No. 6,162,666, Oct. 28, 2003.

Title Pages, IEE Proceedings–E Computers and Digital Techniques, vol. 137 (Mar. 1990).

Michael Payne fax, dated Oct. 2, 2002.

"Automated synthesis of combinational circuits by cascade networks of multiplexers," by R.K. Gorai and A Pai, IEE Proceedings, vol. 137, Pt E, No. 2, Mar. 1990, pp. 164–170.

"Cascade networks of logic functions built in multiplexer units," by A J Tosser and D Aoulad–Syad, IEE Proceedings, vol. 127, Pt E, No. 2, Mar. 1980, pp. 64–68.

"Universal logic gate transmission gate array," by C Zhang Electronic Engineering Oct. 1985, pp. 61–67.

Koyama, Susumu, "Superfax MOS Device," *Superfast Digital Device Series 2*, published Feb. 10, 1986, including a concise explanation of relevance, explanatory sheet, and translation.

Spaanenburg, L. et al., A Short Course in Structured Testable Gate Array Design, *Journal of Semicustom ICS*, vol. 3, No. 3, 1986 Ben Electronics Publications Ltd. Cited by Japanese Patent Office as prior art in the Notice of Refusal to Register.

Toshiba CMOS Gate Array TC120G Series Macrocell Library, Version 1, P5181–P5L85, Aug. 1988. Cited by Japanese Patent Office as prior art in the Notice of Refusal to Register.

Koyama, Susumu, Superfast Digital Device Series 2, Superfast MOS Device, Published Feb. 10, 1986.

Katoozi, Mehdi, et al., A Testable CMOS Synchronous Counter, *IEEE Journal of Soild–State Circuits*, vol. 23, No. 5, Oct. 1998. Cited by Japanese Patent Office as prior art in the Notice of Refusal to Register.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–27 are cancelled.

\* \* \* \* \*